Dec. 10, 1929.  I. H. GRAY  1,738,892
SWINGING TAG FORKED MOUNTING
Filed May 21, 1928
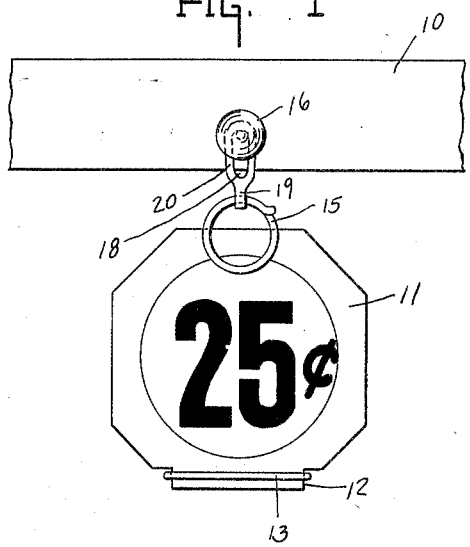
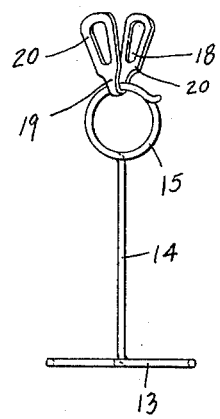
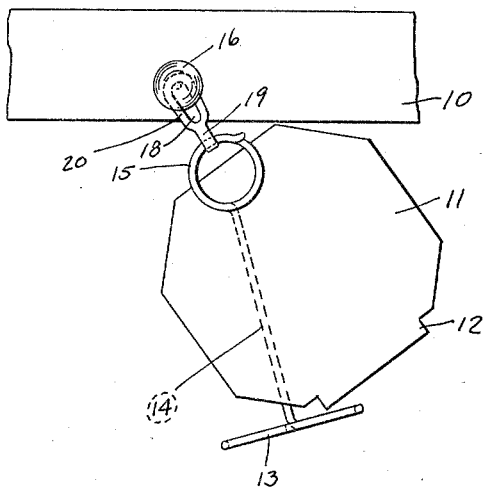
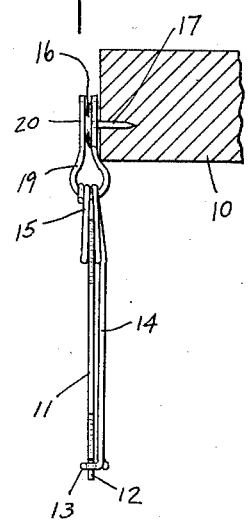
INVENTOR.
ISHMAEL H. GRAY.
BY
ATTORNEYS.

Patented Dec. 10, 1929

1,738,892

UNITED STATES PATENT OFFICE

ISHMAEL H. GRAY, OF INDIANAPOLIS, INDIANA

SWINGING TAG FORKED MOUNTING

Application filed May 21, 1928. Serial No. 279,315.

This invention relates to a swinging support for price tags and the like.

The chief object of this invention is to provide a relatively cheap, substantially permanently connected assembly of few parts adapted to swingingly support a price tag or the like.

The chief feature of the invention consists in the combination of a headed anchoring member and a price tag support member and a connection therebetween which is substantially U-shaped. In the present form the midportion forms a pivot for the price tag support member while one end of the U-shaped connection is apertured through which extends the shank of the headed member, said headed member being locked in mounted relation therein by the other end of the U-shaped connection.

The full nature of the invention will be understood from the accompanying drawings and the following description and claims.

In the drawings Fig. 1 is an elevational view of a shelf, the price tag, its support and the mounting therefor including the invention. Fig. 2 is an elevational view of the price tag support and mounting therefor prior to the locking of the anchoring member to the connection. Fig. 3 is a view similar to Fig. 1 but shows the price tag in one position preliminary to mounting in the holder. Fig. 4 is a side elevation of the members shown in Fig. 1, the shelf being shown in section.

In the drawings 10 indicates a shelf or similar support, 11 the price tag of suitable conformation including a stub or tail portion 12. Herein the price tag is shown substantially octagonal. The price holder includes an elongated loop 13, an intermediate body portion or stem 14 and a multiple circular loop 15. The price tag 11 is initially positioned between the coils of the loop 15, as shown in Fig. 3, then positioned so that the portion 12 registers with the elongated loop 13 and is nested therein, as shown in Figs. 1 and 4. The aforesaid construction is the subject of my prior Patent No. 1,410,402 dated March 21, 1922.

As shown clearly in the several figures, a headed member herein shown in the form of a thumb tack with a head portion 16 and a shank portion 17, has the shank portion extending through the eye or aperture 18, in one arm 20 of a U-shaped connector having the midportion 19 and the opposite arm 20. The two arms 20 are brought together from the flat into the position shown in Fig. 2 so as to partially encircle the adjacent coil portions of the loop 15 and thus permit swinging movement of the entire tag support in a plane including the support, as well as swinging movement in a direction transverse thereto. When thus positioned in relatively separated relation the shank of the thumb tack is passed through one of the openings 18 in one of the arms with the head positioned between the two arms. The opposite arm is then brought into abutable relation with the head of the thumb tack and thus the tack and the tag support are relatively permanently connected together.

Forcible separation can be obtained by separating the two arms of the U-shaped link. The link is swiveled on the thumb tack and one arm also retains the thumb tack in relatively permanent connection with the combination.

The invention claimed is:

1. The combination of a tag support including a loop, a U-shaped member swingingly supporting said loop at the bight portion and including an eye at one end, and a headed anchoring member extending through the eye and swingingly supporting the U-shaped member upon an axis transverse to the bight mounting.

2. In the combination of the character set forth as defined by claim 1, said headed member having its head portion interposed between the arms of the U-shaped member and lockingly retained thereby.

3. In the combination of the character set forth as defined by claim 1, said headed member having its head portion positioned to prevent accidental separation of the tag support from the U-shaped member through the open portion of the latter.

4. The combination of the character as defined by claim 1 characterized by the headed member having its head portion interposed between the arms of the U-shaped member and lockingly retained thereby and preventing accidental separation of the tag support from the U-shaped member through the open portion of the latter.

In witness whereof I have hereunto affixed my signature.

ISHMAEL H. GRAY.